(No Model.)
F. J. COOPER.
METAL WHEEL.
No. 554,054. Patented Feb. 4, 1896.
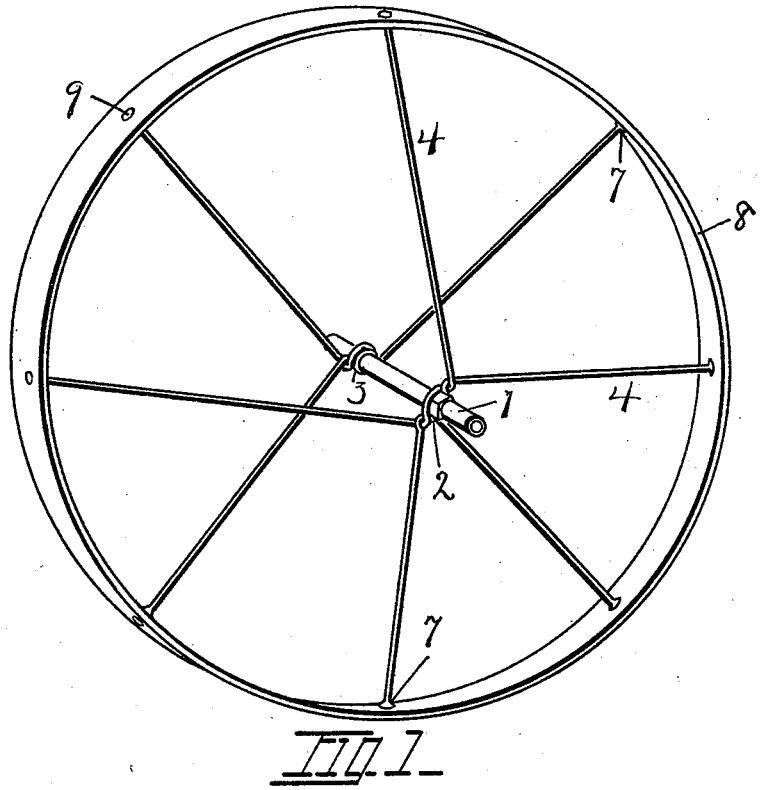
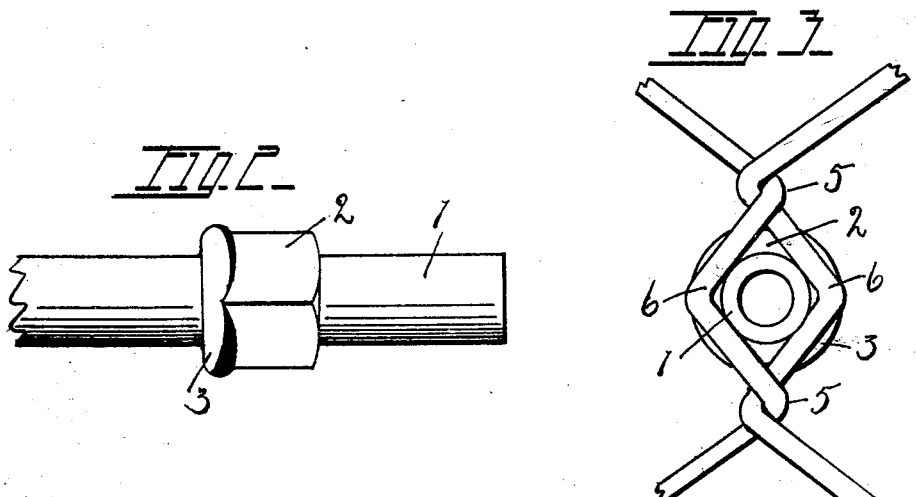
WITNESSES
Carl B. Keller.
Maud Schumacher.
INVENTOR
Frank J. Cooper
By William Webster
atty

UNITED STATES PATENT OFFICE.

FRANK J. COOPER, OF TOLEDO, OHIO, ASSIGNOR TO AUGUSTA MESTER.

METAL WHEEL.

SPECIFICATION forming part of Letters Patent No. 554,054, dated February 4, 1896.

Application filed June 24, 1895. Serial No. 553,781. (No model.)

*To all whom it may concern:*

Be it known that I, FRANK J. COOPER, of Toledo, county of Lucas, and State of Ohio, have invented certain new and useful Improvements in Metal Wheels; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a metal wheel, and has especial relation to the character of wheels used in the construction of wheelbarrows, although I wish it distinctly understood that the distinctive features herein illustrated and claimed are equally adaptable to wheels for children's carriages, velocipedes, bicycles, agricultural implements, band-pulleys, and wheels of analogous construction.

The object of the invention is to cheapen the construction both in the item of material and manufacture and to build a wheel of greater strength than heretofore.

With these objects in view the invention consists broadly in a wheel having a hub formed with limiting-stops and duplex spokes twisted to embrace the hub and radiating to the circumference. Incidental to these objects, but not in subordination thereof, is a further object of forming a shoulder upon the ends of the spokes, against which the tire is drawn in the act of riveting the spokes.

A further object is to form the ends of the hub encircled by the intermediate portion of the spokes between the twists of an angular or a diamond shape, whereby the possibility of revolution of the hub due to friction is entirely avoided.

In the drawings, Figure 1 is an elevation of a wheel constructed in accordance with a preferred form of my invention. Fig. 2 is a sectional detail of the hub, showing one end thereof with the angular enlargement and the shoulder against which the encircling portion of the spokes abut when in tension. Fig. 3 is an end view of the hub, showing the encircling portion of the spokes and twist thereof.

In constructing the wheel in accordance with my invention I preferably employ a wrought-iron and drawn tubular portion of pipe 1 of the proper length to form the hub and by proper mechanical means expand the hub upon or near each end to form the angular portion 2 and the raised collar 3, the two collars being separated the desired distance upon the hub to give the proper inclination of pitch to the spokes. The spokes 4 4 are arranged in pairs, first being cut to the desired length and oppositely twisted centrally, as at 5 5, to tension the central loop 6 6 upon the angular portion 2 of the hub and the outer ends of the spokes are preferably shouldered at 7, the shoulders bearing against the rim 8 when the ends 9 of the spokes are riveted in the rim.

It will be seen from the foregoing that I have reduced the expense of construction of a metal wheel to a minimum, insuring a maximum amount of strength and entirely obviating the necessity of skilled workmen or expensive machinery in the construction of the wheel, as has been heretofore required.

What I claim is—

1. In a metal wheel, a hub formed with limiting-stops, and spokes twisted in pairs to form a central loop to receive the hub and abut against the stops, the ends thereof radiating therefrom to the rim.

2. In a metal wheel, a hub having integral limiting-stops, and angular portions extending therefrom in opposite directions, duplex spokes twisted to form a central loop tensioned in angular conformation upon the angular portion of the loop and radiating to the rim.

3. In a metal wheel, a hub, spokes twisted in pairs to loop upon the hub, the tension of the loop being caused by opposite twists of the spokes, and the free end portion of the spokes radiating to, and attached to the rim.

4. In a metal wheel, a rim, a plurality of spokes arranged in pairs and formed with oppositely-disposed twisted portions sufficiently near the center thereof to receive the hub portion, a shoulder at the outer ends to abut against the rim with projecting end portions to rivet at the periphery of the rim, and a hub-section passed through the loops.

In testimony that I claim the foregoing as my own I hereby affix my signature in presence of two witnesses.

FRANK J. COOPER.

Witnesses:
WILLIAM WEBSTER,
CARL H. KELLER.